US009648947B2

(12) United States Patent
Wetzstein

(10) Patent No.: US 9,648,947 B2
(45) Date of Patent: May 16, 2017

(54) METHOD AND APPARATUS FOR A ONE-LEGGED TABLE ASSEMBLY

(71) Applicant: John Michael Wetzstein, Fort Lauderdale, FL (US)

(72) Inventor: John Michael Wetzstein, Fort Lauderdale, FL (US)

(*) Notice: Subject to any disclaimer, the term of this patent is extended or adjusted under 35 U.S.C. 154(b) by 0 days.

(21) Appl. No.: 15/257,460

(22) Filed: Sep. 6, 2016

(65) Prior Publication Data

US 2017/0086575 A1    Mar. 30, 2017

Related U.S. Application Data

(60) Provisional application No. 62/232,127, filed on Sep. 24, 2015.

(51) Int. Cl.
*A47B 5/00*    (2006.01)
*A47B 5/06*    (2006.01)
*A47B 37/04*   (2006.01)
*A47B 3/12*    (2006.01)
*A47B 5/02*    (2006.01)

(52) U.S. Cl.
CPC ............ *A47B 5/06* (2013.01); *A47B 3/12* (2013.01); *A47B 5/02* (2013.01); *A47B 37/04* (2013.01)

(58) Field of Classification Search
CPC ......... A47B 23/041; A47B 31/06; A47B 5/00; A47B 5/06
USPC .............. 108/152, 47, 48, 44, 43; 297/217.7
See application file for complete search history.

(56) References Cited

U.S. PATENT DOCUMENTS

| | | | | | |
|---|---|---|---|---|---|
| 2,814,892 | A | * | 12/1957 | Larsen | D06F 81/06 108/135 |
| 2,833,608 | A | * | 5/1958 | Tobias | B60N 3/001 108/44 |
| 2,867,484 | A | * | 1/1959 | Jennings | B60N 3/002 108/135 |
| 4,124,094 | A | * | 11/1978 | Cande | A01M 31/02 108/151 |
| 4,601,364 | A | * | 7/1986 | York | A01M 31/02 108/152 |
| 4,705,143 | A | * | 11/1987 | Ziemba | A01M 31/02 108/152 |
| 5,156,096 | A | * | 10/1992 | Lamprey | A47B 96/027 108/108 |
| 5,528,993 | A | * | 6/1996 | Vincelli | A47B 5/06 108/42 |
| 5,918,550 | A | * | 7/1999 | Weir | A47B 5/06 108/152 |
| 5,944,241 | A | * | 8/1999 | Globig | A01M 31/02 182/187 |
| 6,044,773 | A | * | 4/2000 | Bauer | B25H 1/12 108/50.11 |

(Continued)

*Primary Examiner* — Jose V Chen
(74) *Attorney, Agent, or Firm* — The Concept Law Group, P.A.; Yongae Jun; Paul Murty

(57) ABSTRACT

A table assembly is disclosed that includes a tabletop having a first end and a second end, opposite the first end; a table leg couplable to the first end so as to support the first end when coupled thereto; and a resilient fastening member couplable to the second end and operably configured to selectively fasten the second end to an independent support structure so as to support the second end when the resilient fastening member is fastened to the independent support structure.

17 Claims, 12 Drawing Sheets

(56) References Cited

U.S. PATENT DOCUMENTS

| | | | | |
|---|---|---|---|---|
| 6,098,552 | A * | 8/2000 | Gunderson | A47B 57/567 |
| | | | | 108/108 |
| 6,926,240 | B2 * | 8/2005 | Goeller | A01K 97/10 |
| | | | | 108/151 |
| 7,258,401 | B2 * | 8/2007 | Smith | A01M 31/02 |
| | | | | 297/463.2 |
| 7,290,552 | B1 * | 11/2007 | Eisbrenner | E04H 15/04 |
| | | | | 135/117 |
| 7,516,707 | B2 * | 4/2009 | Schrot | A01M 31/02 |
| | | | | 108/152 |
| 8,177,177 | B2 * | 5/2012 | Ehrig | A01M 31/02 |
| | | | | 182/187 |
| 8,205,626 | B2 * | 6/2012 | Myers | A01M 31/02 |
| | | | | 135/90 |
| 8,789,653 | B2 * | 7/2014 | Priest | A01M 31/02 |
| | | | | 182/100 |
| 9,175,921 | B2 * | 11/2015 | Hughes | F41A 23/12 |
| 9,220,337 | B1 * | 12/2015 | Wenzel | A47B 13/021 |
| 2004/0112259 | A1 * | 6/2004 | Zeiders | A47B 23/041 |
| | | | | 108/43 |
| 2006/0162623 | A1 * | 7/2006 | Ciulla | A47B 5/06 |
| | | | | 108/48 |
| 2013/0068142 | A1 * | 3/2013 | Wellman | A47B 37/04 |
| | | | | 108/42 |

* cited by examiner

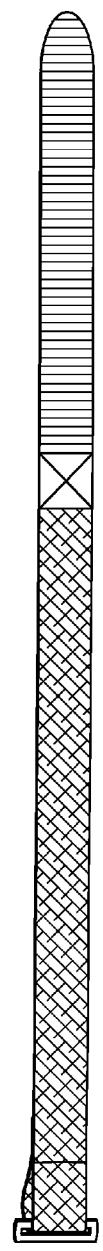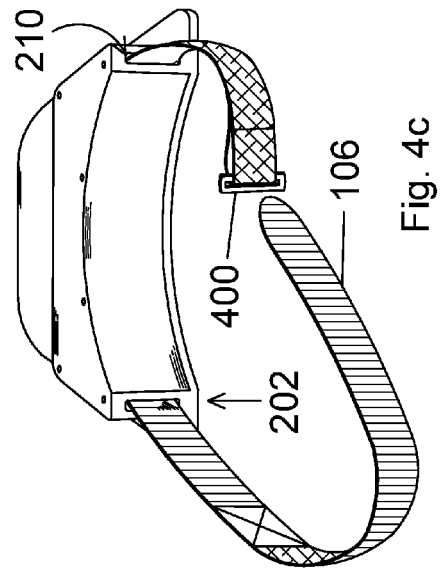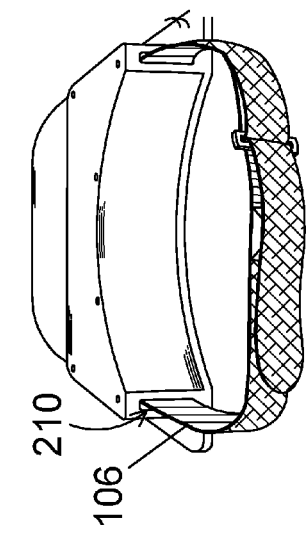

104

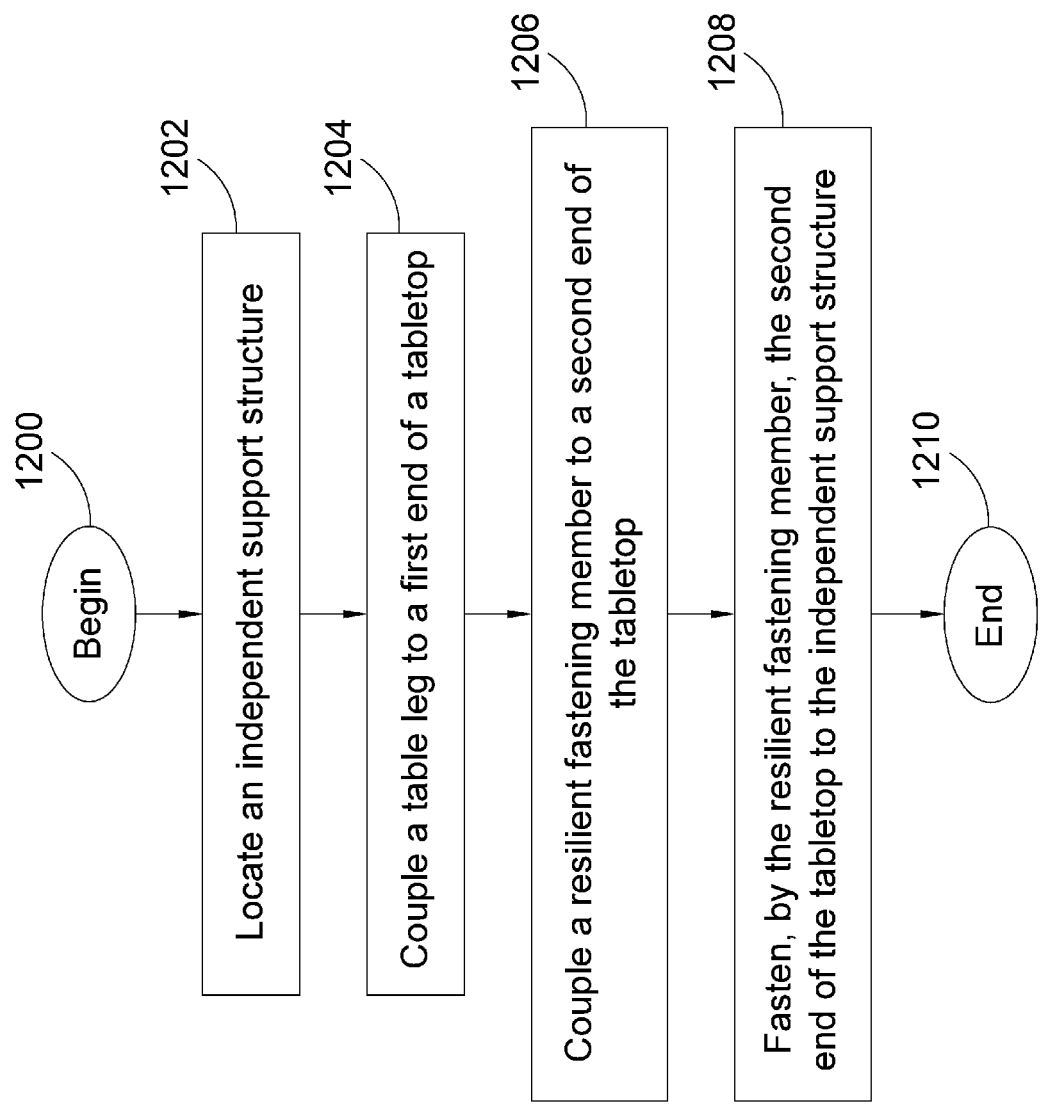

METHOD AND APPARATUS FOR A ONE-LEGGED TABLE ASSEMBLY

CROSS-REFERENCE TO RELATED APPLICATION

This application claims priority to U.S. Provisional Patent Application No. 62/232,127 filed Sep. 24, 2015, the entirety of which is incorporated by reference.

FIELD OF THE INVENTION

The present invention relates generally to tables, and, more particularly, relates to a one-legged table and method of mounting the table to an independent support.

BACKGROUND OF THE INVENTION

It is often desired to have a planar support surface, such as a table, when enjoying outdoor activities, such as painting, eating, drinking, socializing, and the like. Unfortunately, tables are not always available outdoors. Users can bring a table to the outdoor environment; however, existing tables are not configured for portability, being excessively heavy to carry and/or cumbersome to set up in an outdoor environment. Existing tables are also relatively large and are not easily stored in a vehicle trunk or backseat area. Accordingly, what is desired is a table structure with a relatively small footprint suitable for storage, transport by a single adult individual, and easily usable in an outdoor environment.

Therefore, a need exists to overcome the problems with the prior art as discussed above.

SUMMARY OF THE INVENTION

The invention provides a method and apparatus for a one-legged table assembly that overcomes the hereinafore-mentioned disadvantages of the heretofore-known devices and methods of this general type.

With the foregoing and other objects in view, there is provided, in accordance with the invention, a table assembly including a tabletop having a first end and a second end, opposite the first end; a table leg couplable to the first end so as to support the first end when coupled thereto; and a resilient fastening member couplable to the second end and operably configured to selectively fasten the second end to an independent support structure so as to support the second end when the resilient fastening member is fastened to the independent support structure.

In accordance with another feature of the present invention, the second end defines a lateral recess shaped to receive at least a portion of the independent support structure therein from a lateral direction.

In accordance with yet another feature of the present invention, the independent support structure is one of a tree and a building column; and the second end defines a lateral recess shaped and configured to matingly receive at least a portion of one of the tree and the building column.

In accordance with another feature of the present invention, the second end defines a lateral recess shaped to receive at least a portion of the independent support structure therein; and the resilient fastening member and the lateral recess together define a receiving area operably configured to receive the independent support structure therein.

In accordance with yet another feature of the present invention, the resilient fastening member is formed as an adjustable strap.

In accordance with an additional feature of the present invention, the table leg is removeably couplable to the first end and the resilient fastening member is formed as a shoulder strap operably for a user to carry the tabletop.

In accordance with another feature of the present invention, the independent support structure is fixedly connected to a ground surface on which the table leg is adapted to rest to support the first end of the tabletop.

In accordance with another feature of the present invention, the first end to which the table leg is couplable is not a center portion of the tabletop, and the table assembly is adapted for use without a second table leg.

In accordance with yet another feature of the present invention, the tabletop further includes a bottom portion disposed beneath a top surface of the tabletop, the bottom portion defining a resilient fastening member channel disposed beneath the top surface of the tabletop and operably configured to receive a first portion of the resilient fastening member therein, with a second portion of the resilient fastening member extending outwardly relative to the tabletop away from the second end of the tabletop.

In accordance with a further feature of the present invention, the tabletop defines at least one aperture having an opening defined by a top surface of the tabletop, the opening shaped to receive a peg through the top surface and the aperture sized to frictionally retain a coupled end of the peg therein, with a free end of the peg extending in a vertical direction above the top surface so as to form a protrusion on the tabletop, the free end disposed opposite the coupled end.

In accordance with another feature, an embodiment of the present invention includes a one-legged table assembly having a tabletop with a first end, a second end opposite the first end, a top surface, and a bottom surface opposite the top surface; a table leg having a ground-engaging end opposite a tabletop-engaging end, the tabletop-engaging end couplable to the bottom surface of the first end so as to support the first end in an upright configuration when coupled thereto and when the ground-engaging end of the table leg is disposed on a ground surface; and a resilient fastening member couplable to the second end and operably configured to selectively fasten the second end to an independent support structure so as to support the second end in the upright configuration when the resilient fastening member is fastened to the independent support structure, the independent support structure being fixedly connected to the ground surface on which the ground-engaging end of the table leg is disposed in the upright configuration.

In accordance with the present invention, a method for forming a two-legged table by mounting a one-legged table assembly to natural or man-made independent support structure fixedly connected to a ground. The method includes locating an independent support structure that is one of a natural and a man-made independent support structure fixedly connected to a ground and extending upwardly from the ground in a vertical direction; coupling a table leg to a first end of a tabletop; coupling a resilient fastening member to a second end of the tabletop; and fastening the second end of the tabletop to the independent support structure such that the second end is supported by the independent support structure and the first end is supported by the table leg.

In accordance with another feature, an embodiment of the present invention also includes engaging a lateral recess defined by the second end of the tabletop to at least a portion the independent support structure and selectively tightening the resilient fastening member about the independent support structure so as to secure the tabletop, together with the table leg, in an upright configuration.

In accordance with yet another feature, an embodiment of the present invention includes inserting the resilient fastening member into a channel defined by the tabletop.

Although the invention is illustrated and described herein as embodied in a method and apparatus for a one-legged table assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the tabletop from a first end to a second end of the tabletop.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 4a-4d are fragmentary, perspective views of the table assembly of FIG. 1, illustrating steps for inserting the fastening member into the channel and coupling the fastening member to the tabletop, in accordance with an embodiment of the present invention;

FIG. 12 is a flow chart illustrating an exemplary process for mounting the table assembly of FIG. 1 to an independent support structure, in accordance with the present invention.

DETAILED DESCRIPTION

Figure 1:
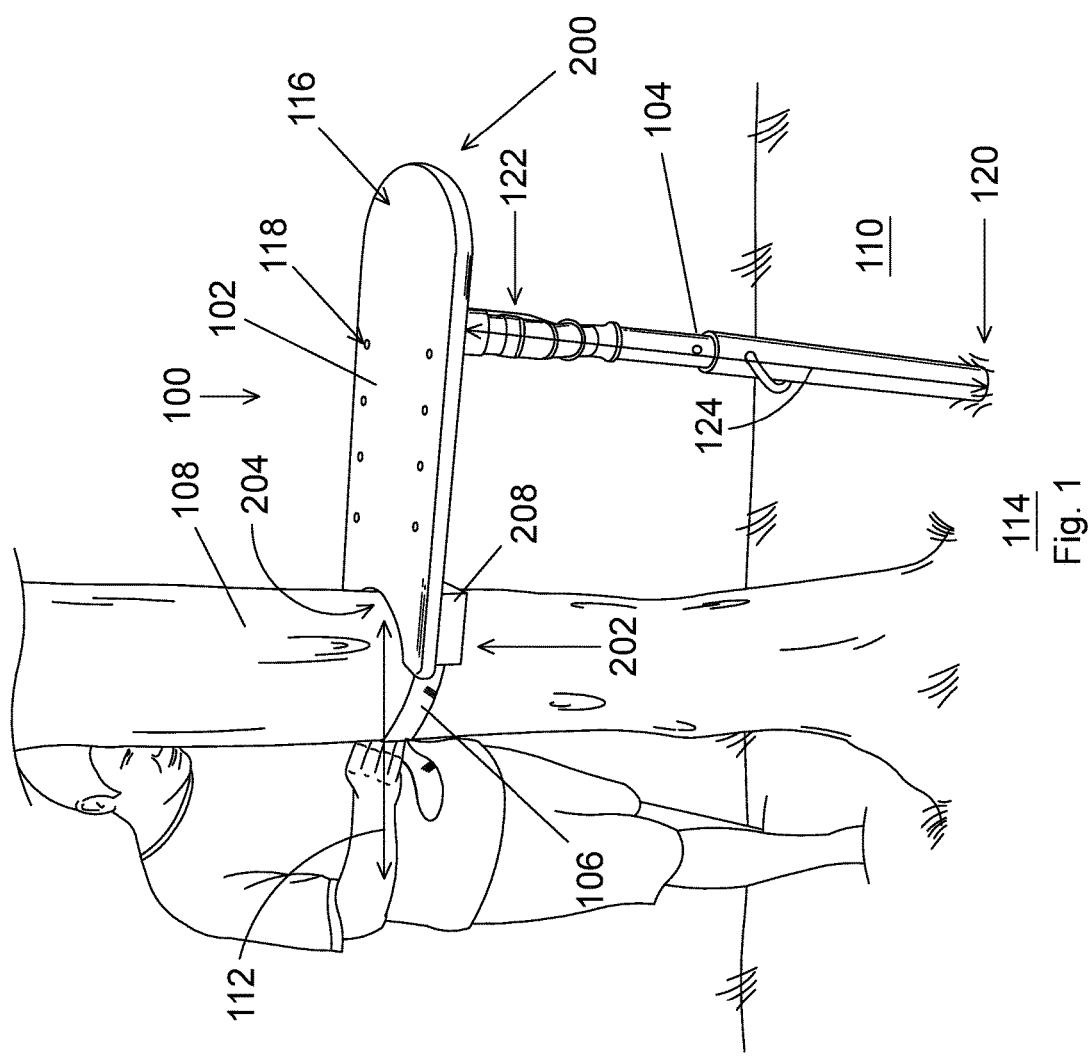
FIG. 1 is a downward-looking perspective view of a table assembly in accordance with an embodiment of the present invention, the table assembly shown coupled to a tree and including a tabletop, a fastening member, and a table leg.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient one-legged table assembly. Embodiments of the present invention provide a table assembly that is relatively lightweight and convenient to set-up in an outdoor environment, as well as, indoor environments. In addition, embodiments of the one-legged table assembly are intended to be partially supported by independent support structures, such as trees or outdoor building columns. By not requiring two or more legs to support the tabletop, the weight of the table structure can be greatly reduced, as well as, the manufacturing costs that would be expended to manufacture additional legs. Embodiments of the present invention are designed to be environmentally friendly, being made from recycled materials. Also, by not manufacturing additional legs and, instead using independent support structures for support, the table assembly of the present invention reduces waste. In addition, fastening the one-legged table assembly to independent natural structures, such as trees, as with some embodiments of the present invention, gives users the feeling of being closer to nature. Other embodiments of the present invention include a single support leg couplable to one end of a tabletop and a fastening strap couplable to an opposing end of the tabletop. In further embodiments, the fastening strap is intended to be secured to the independent support structure so that one end of the tabletop can be partially supported by said independent support structure; in other words, leveraging independent support structures so as to provide two-legged tabletop support with only a single table leg.

Figure 2:
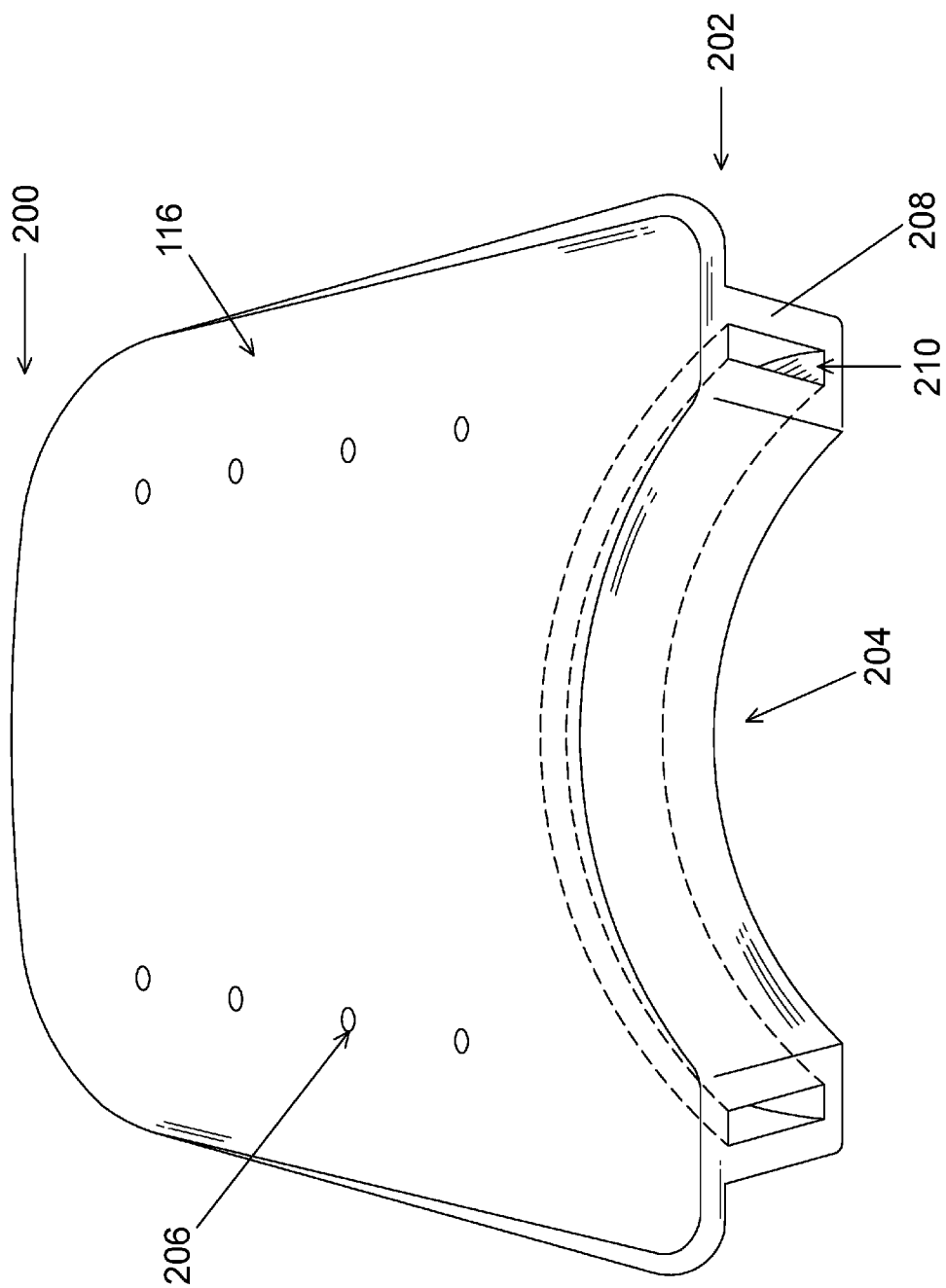
FIG. 2 is a downward-looking perspective view of the tabletop of FIG. 1, illustrating a fastening member receiving channel of the tabletop, in accordance with the present invention.
Figure 3:
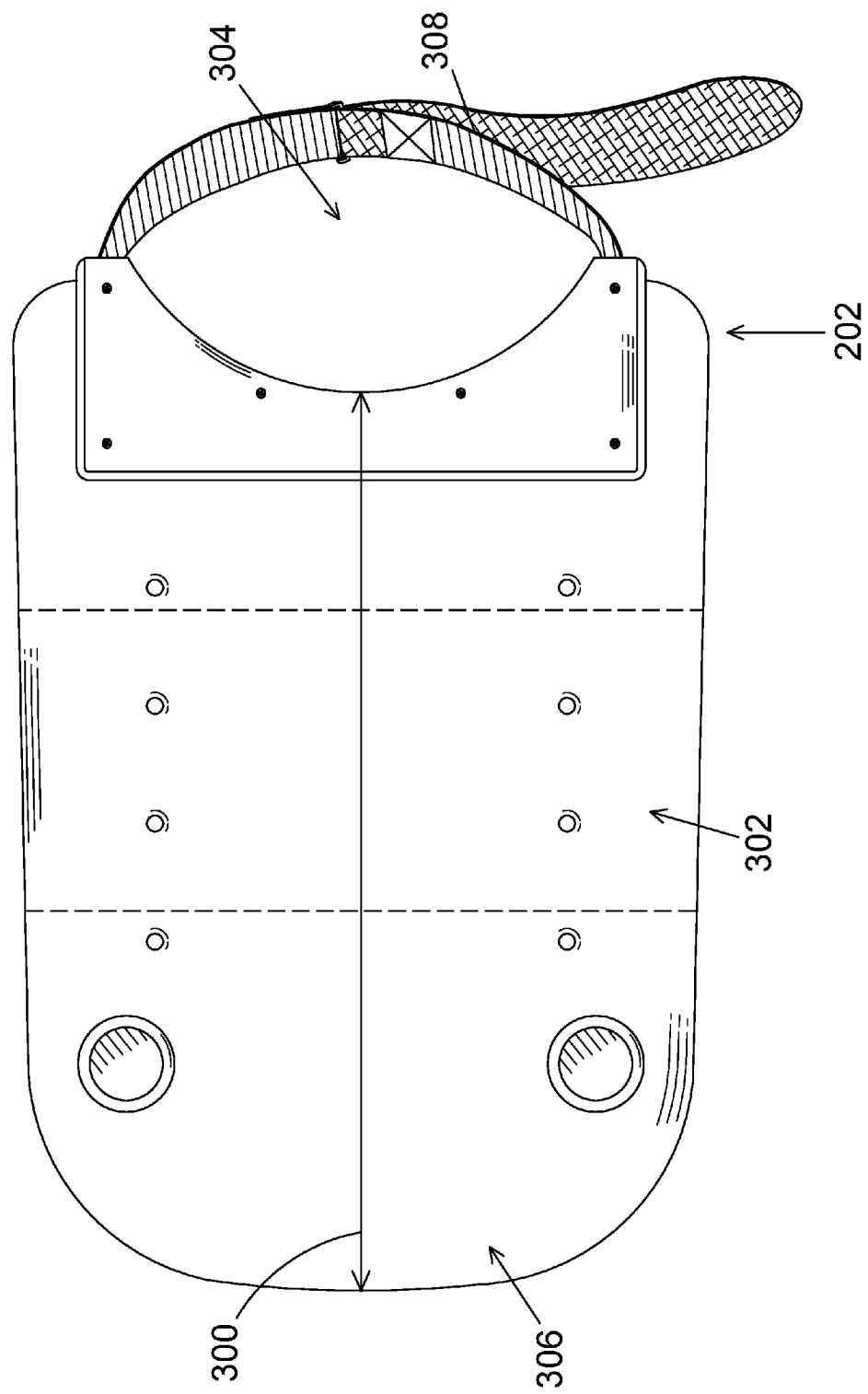
FIG. 3 is a top plan view of a bottom portion of the tabletop of FIG. 1, shown with the fastening member inserted within the channel, in accordance with an embodiment of the present invention.

Referring now to FIGS. 1-3, one embodiment of the present invention is shown. FIGS. 1-3 show several advantageous features of the present invention, but, as will be described below, the invention can be provided in several shapes, sizes, combinations of features and components, and varying numbers and functions of the components. The first example of a one-legged table assembly 100, as shown in FIG. 1, includes a tabletop 102, a table leg 104, and a resilient fastening member 106. As can be seen in FIG. 1, the tabletop 102 is couplable to an independent support structure 108 (e.g., a tree) affixed to a ground surface 110. The tabletop 102 may be couplable to the independent support structure 108 by the resilient fastening member 106, with the table leg 104 coupled to the tabletop 102 and disposed on the ground surface 110 so as to provide two-legged support for the tabletop 102 with only a single table leg 104.

In the exemplary embodiment, depicted in FIG. 1, the tabletop 102 is oblong-shaped. In other embodiments, the tabletop 102 may be provided in other shapes, such as rectangular, circular, or oval-shaped, or may be shaped as a leaf. In yet other embodiments, the tabletop 102 may be provided in a trapezoidal-shape, a triangular-shape, and other polygon shapes.

In one embodiment, the tabletop 102 includes a first end 200 and a second end 202. In a further embodiment, the second end 202 is opposite the first end 200. In one embodiment, the table leg 104 is couplable to the first end 200 so as to support the first end 200 when coupled thereto, as depicted in FIG. 1. In another embodiment, the second end 202 is couplable to the independent support structure 108 so as to support the second end 202 of the tabletop 102 when coupled thereto.

Unless otherwise stated herein, the term "end" (when used in the phrases "first end" and "second end" herein to refer to ends of the tabletop 102) can be defined by dividing the tabletop 102, along an elongation length 300, into three sections of equal length, with the "ends" being the sections on either side of a center section 302. Stated another way, the first end 200, to which the table leg 104 is couplable, is not a center section/portion of the tabletop 102 and the table assembly 100 is adapted for use without a conventional second table leg. In other words, the table assembly 100 is configured as a one-legged offset table, in which two-legged support may be provided by the independent support structure 108 being coupled to the other end of the tabletop 102 by the resilient fastening member 106.

In one embodiment, the second end 202 may be shaped to matingly receive the independent support structure 108 therein, or at least a portion of the independent support structure 108. In a further embodiment, the second end 202 may be considered to define a lateral recess 204. As used herein, the term "lateral recess" is intended to indicate a space or area created by a sidewall portion of the tabletop 102 being further back, i.e., towards a center of the tabletop 102, from the rest of the sidewall. In one embodiment, the lateral recess 204 is shaped to receive at least a portion of the independent support structure 108 therein from a lateral direction 112.

Figure 8:
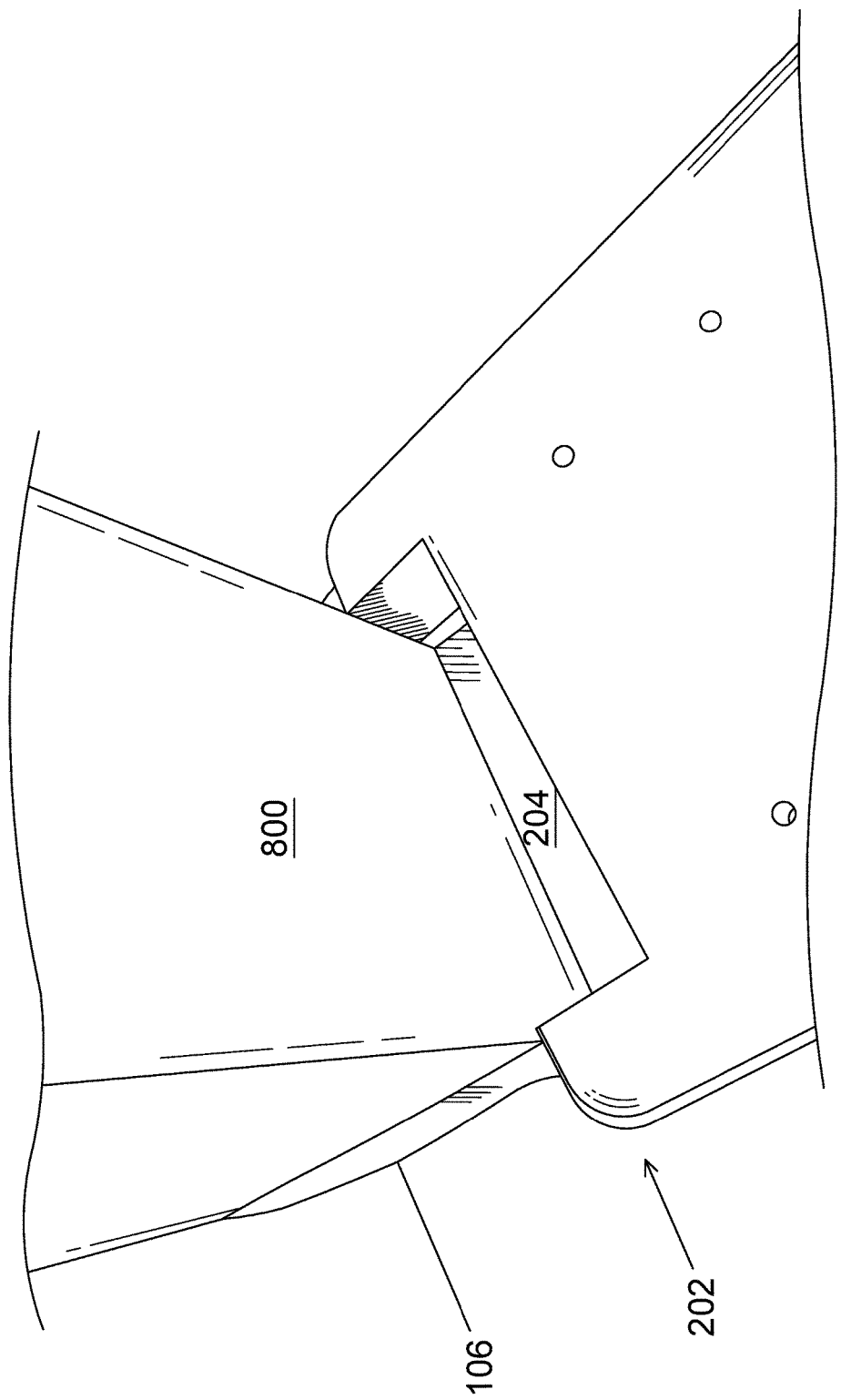
FIG. 8 is a downward-looking perspective view of another exemplary embodiment of a table assembly, in accordance with the present invention, illustrating a tabletop with a rectilinear-shaped recess shown coupled to a building column.

In one embodiment, the independent support structure 108 is a tree. In such an embodiment in which the second end 202 is shaped to engage with a tree, the lateral recess 204 may be shaped and configured to matingly receive at least a portion of the tree. In other words, the lateral recess 204 may be semi-circular-shaped so as to receive a portion of a tree's trunk, which is generally circular in cross-section. In an alternative embodiment, the independent support structure 108 is a building column 800 (FIG. 8). In such an embodiment in which the second end 202 is shaped to engage with a building column, the lateral recess 204 may be shaped and configured to matingly receive at least a portion of the building column 800, as best depicted herein in FIGS. 8 and 9. In other words, the lateral recess 204 may be rectangular-shaped so as to receive a portion of the building column 800, which may have a rectangular cross-section (although some building columns have circular, or other cross-sections). In other embodiments, the lateral recess 204 may be formed as other shapes and sizes.

In yet another embodiment, the second end 202 may be shaped the same or substantially the same as the first end 200. In other words, in some non-preferred embodiments, the second end 202 may be a non-recessed end, similar to the first end 200. In such embodiments, the resilient fastening member 106 may still be used to fasten the second end 202 to the independent support structure 108; yet, this may result in a less stable and secure fastening of the second end 202 to the independent support structure 108 and may require a tighter fastening of the resilient fastening member 106 than would be required of an embodiment with a recessed end.

In preferred embodiments, the resilient fastening member 106 and the lateral recess 204 together define a receiving area 304 operably configured to receive the independent support structure 108 therein. In the exemplary embodiment, depicted best in FIGS. 1 and 3, the receiving area 304 is formed as an oval-shaped aperture shaped and configured to receive the independent support structure 108 therein for securely fastening, via the resilient fastening member 106, the second end 202 thereto. In other embodiments, the receiving area 304 can be formed as other shapes and configurations, but should be able to selectively retain and secure the second end 202 to the independent support structure 108.

Importantly, the independent support structure 108 should be a stationary object operable to support the second end 202 of the tabletop 102, while the first end 200 is supported by the table leg 104, in an upright configuration 114 of the table assembly 100. As used herein, the term "upright configuration" is intended to indicate a functional configuration of the table assembly 100 as a table. Stated another way, an "upright configuration" is an arrangement of the table assembly 100 in which the table leg 104, disposed on the ground surface 110, is coupled to the first end 200 and the second end 202 is simultaneously coupled to the independent support structure 108 so as to provide a horizontal tabletop surface 116 for use as a table.

In one embodiment, the independent support structure 108 can be said to be fixedly connected to the ground surface 110 on which the table leg 104 is disposed in the upright configuration. As used herein, the term "independent support structure" is intended to indicate a natural (e.g., a tree) or a man-made structure (e.g., a building column) that exists at a location, independent of the table assembly 100; for purposes other than to support the tabletop 102; and that extends upwardly from the ground surface 110. In a preferred embodiment, the independent support structure 108 extends upwardly from the ground surface 110 to at least a height corresponding to a height of the table leg 104 so as to permit the tabletop 102 to provide the horizontal tabletop surface 116. As used herein, the term "horizontal" is intended to indicate lines, planes, or points parallel to, or substantially parallel to the ground surface 110.

The tabletop 102 may be made of any material, but is preferably made of a generally lightweight material so as to be portable. In one embodiment, the tabletop 102 may be of a recycled material. In another embodiment, the tabletop 102 may be made of wood. In yet another embodiment, the tabletop 102 may be made of plastic, or another polymer or polymer-composite material.

The horizontal tabletop surface 116 may also be referred to as a top surface 116 of the tabletop 102. The top surface 116 may be a planar surface. In one embodiment, the tabletop 102 may also have a bottom surface 306. In a further embodiment, the bottom surface 306 may be disposed opposite the top surface 116.

In one embodiment, the tabletop 102 defines at least one aperture 118. In a further embodiment, the tabletop 102 defines a plurality of apertures 118. In yet a further embodiment, the plurality of apertures 118 are arranged as at least an array of apertures 118. In yet a further embodiment, the array of apertures 118 may be equally spaced apart from one another along an elongation direction of the tabletop 102. In yet another embodiment, there may be two or more arrays of apertures 118 defined by the tabletop 102 and may be arranged as a pair of parallel arrays of apertures 118, as depicted in FIG. 1. In other embodiments, the apertures 118 may be provided in other arrangements on the tabletop 102.

Figure 10:
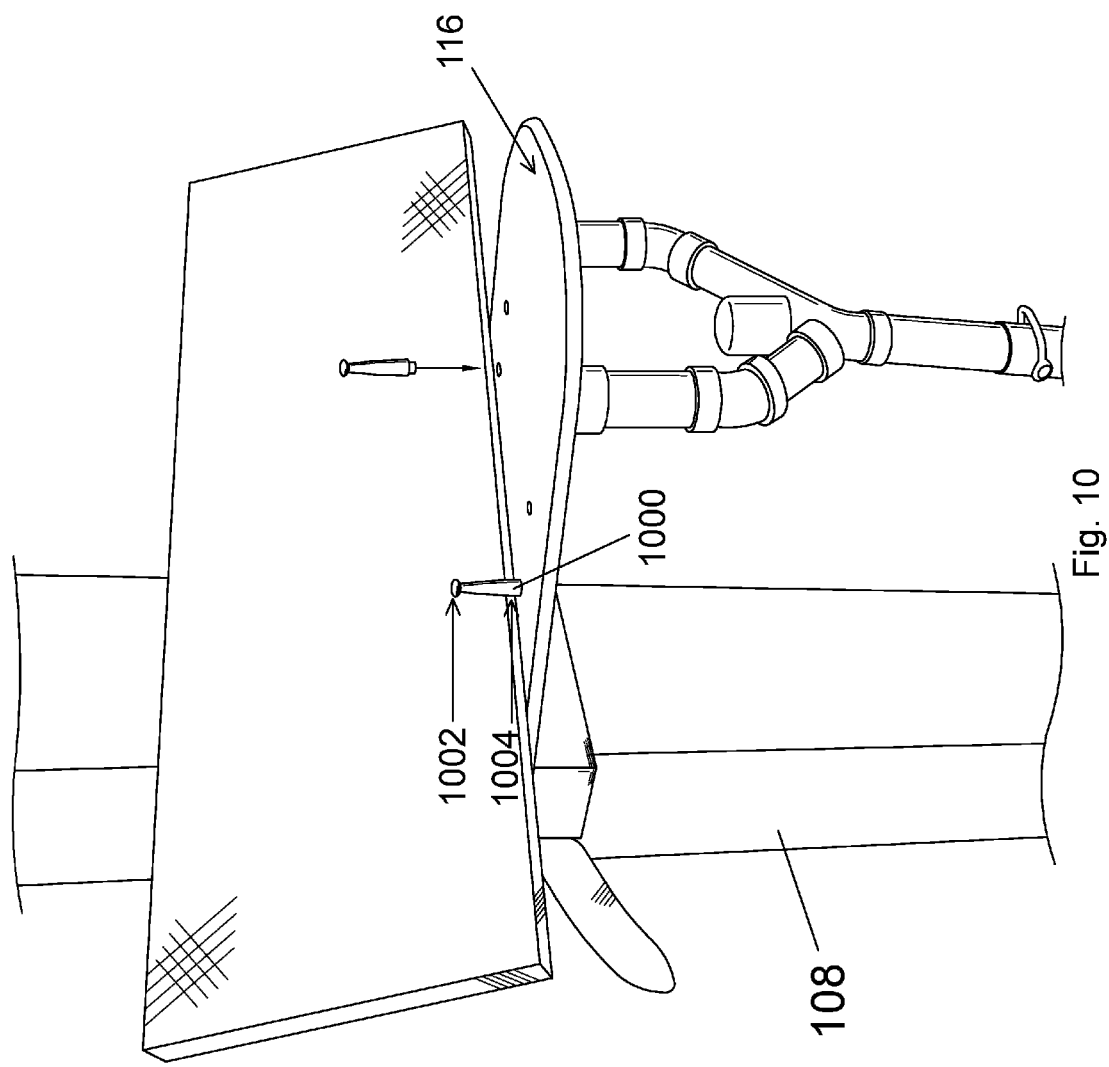
FIG. 10 is a perspective view of still another exemplary embodiment of a table assembly in accordance with the present invention, showing a pair of pegs inserted within a pair of apertures defined by the tabletop for retaining a painter's canvas on the tabletop.

Still referring to FIGS. 1-3, with reference also to FIG. 10, in one embodiment, the apertures 118 may each have an exit/entrance opening 206 defined by the top surface 116 of the tabletop 102. The openings 206 may be shaped to receive a peg 1000 through the top surface 116 and the apertures 118 may be sized to frictionally retain the peg 1000 therein. The peg 1000 may include a free end 1002 and a coupled end 1004 opposite the free end 1002. Specifically, the coupled end 1004 may be sized to frictionally retain the peg 1000 within the aperture 118. In another embodiment, the free end 1002 of the peg 1000 may extend in a vertical direction above the top surface 116, when the coupled end 1004 is retained within the aperture 118, so as to purposefully form a protrusion on the tabletop 102. The protrusion advantageously retains elements, such as a painting canvas, on the tabletop 102. More specifically, in some embodiments, the table assembly 100 may be used for outdoor painting, sketching, or the like. In such embodiments, the protrusions provided by the free end 1002 of the pegs 1000 may retain the canvas, sketch pad, or the like between the independent support structure 108 and the pegs 1000. Canvases, sketch pads, and the like are generally light-weight and may be easily knocked down by a wind force, if not for retention features, such as the pegs 1000 and the apertures 118. In one embodiment, the apertures 118 may be through-holes. In another embodiment, the apertures 118 may be formed as grooves.

Of course, in other embodiments, the tabletop 102 may not include any apertures 118 and may instead include a continuous flat/planar top surface 116, devoice of apertures 118 and/or any protrusions.

Figure 5:
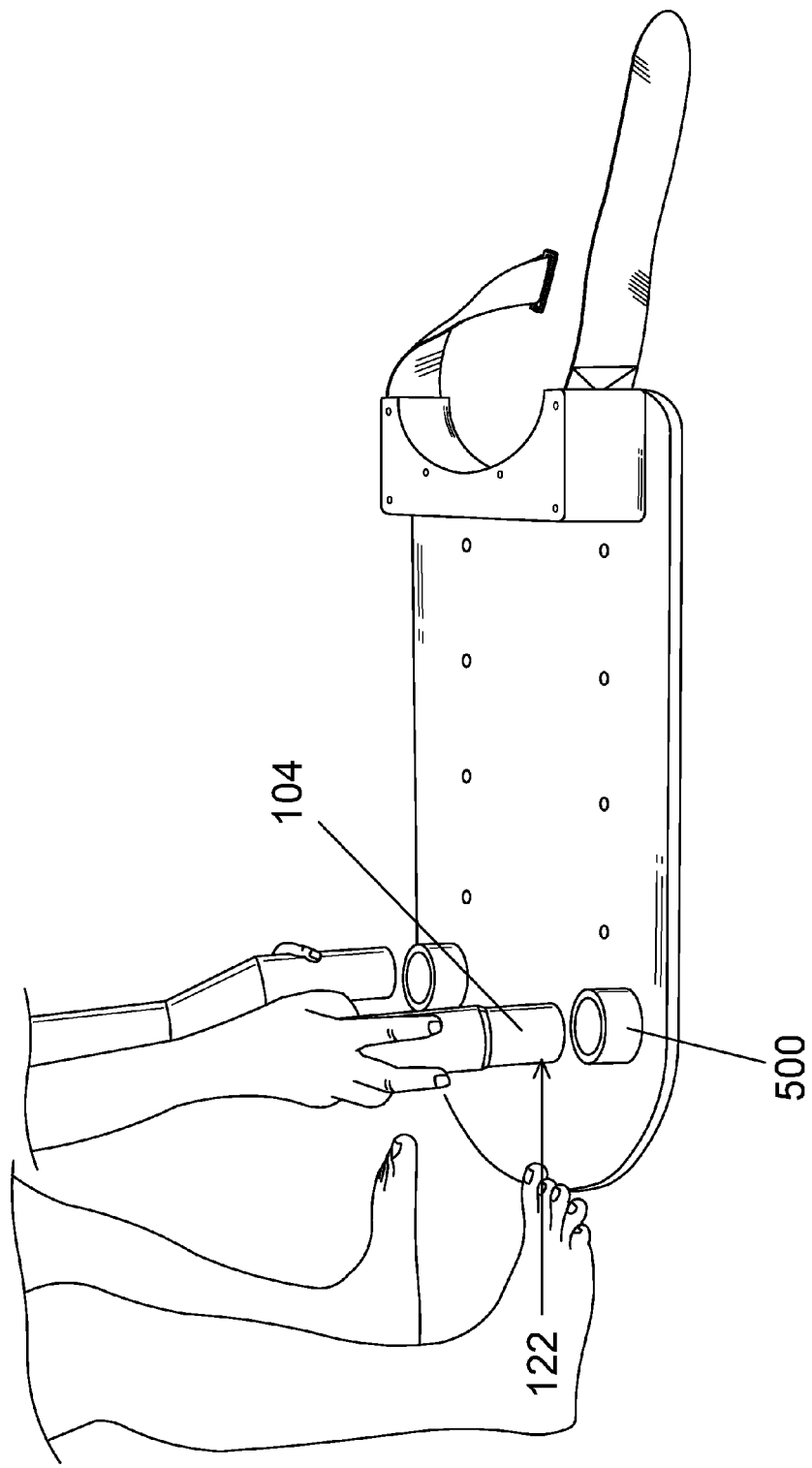
FIG. 5 is a downward-looking perspective view of the bottom portion of the table assembly of FIG. 1, showing ends of the table leg being inserted into a pair of table leg receptacles disposed in the bottom portion, in accordance with an embodiment of the present invention.

Referring again primarily to FIGS. 1-3, with brief reference to FIG. 5, in one embodiment, the table leg 104 may be couplable to the bottom surface 306 of the first end 200 of the tabletop 102 so as to support the first end 200 in the upright configuration 114. In another embodiment, one or more table leg receptacles 500 may be disposed on the bottom surface 306. The table leg receptacles 500 may be sized and shaped to frictionally retain portions of the table leg 104 therein. In one embodiment, the table leg receptacles 500 may be cylindrical-shaped. In other embodiments, the table leg receptacles 500 may be provided as other shapes and sizes. In one embodiment, the table leg 104 may include a ground-engaging end 120 and a tabletop-engaging end 122. In a further embodiment, the ground-engaging end 120 may be opposite the tabletop-engaging end 122 and may be separated by a table leg height 124. The tabletop-engaging end 122 may be couplable to the bottom surface 306 of the first end 200 so as to support the first end 200 in the upright configuration 114 when coupled thereto and when the ground-engaging end 120 is disposed on the ground surface 110. In yet a further embodiment, the tabletop-engaging end 122 may be couplable to the table leg receptacles 500 disposed on the bottom surface 306.

Figure 7:
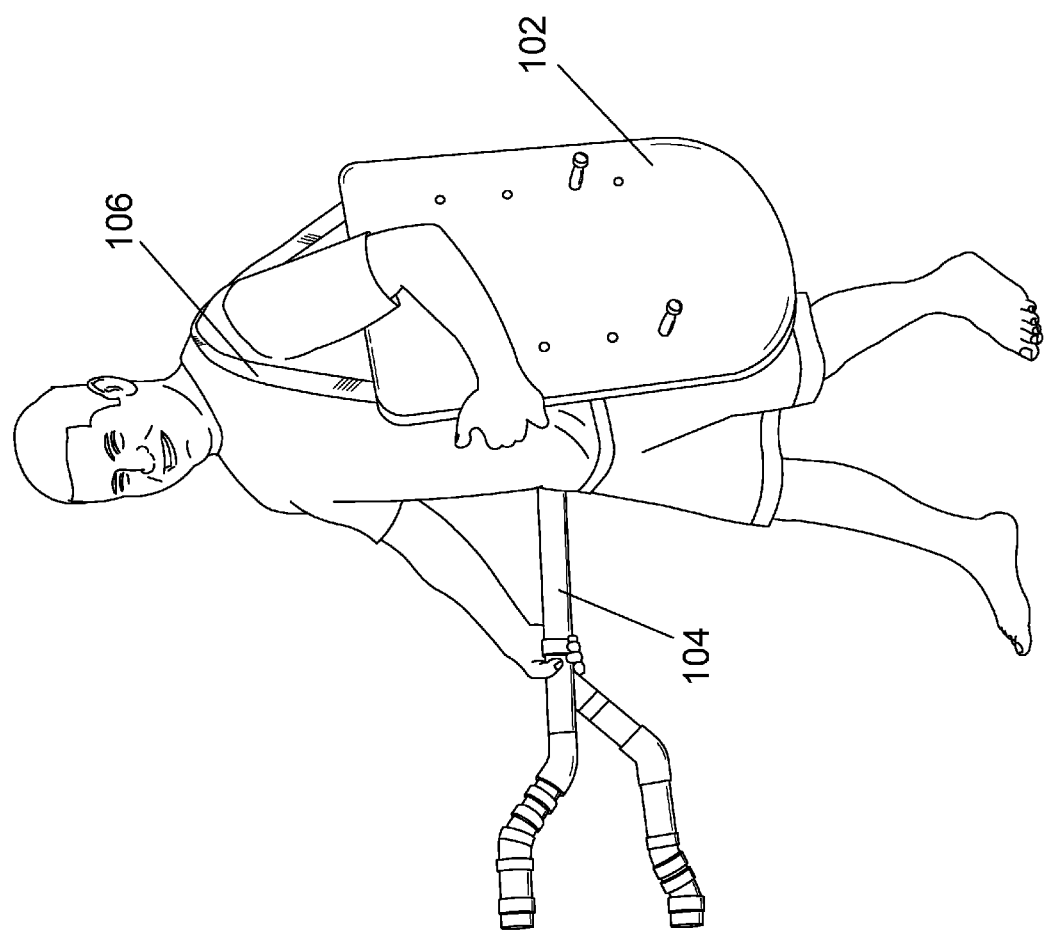
FIG. 7 is perspective view of the table assembly of FIG. 1, shown in a portable configuration, with the table leg uncoupled to the tabletop and the fastening strap operable as a shoulder strap, in accordance with an embodiment of the present invention.

In a preferred embodiment, the table leg 104 is removeably couplable to the bottom surface 306, as depicted in FIG. 5. In another embodiment, the table leg 104 is considered to be removeably couplable to the first end 200. Such removable couplability may be, for example, by a friction fit, a groove, an aperture, or other removeably couplable fastening arrangement. Advantageously, removable couplability of the table leg 104 to the tabletop 102 can allow the overall weight of the table assembly 100 to be distributed by the user, as depicted in FIG. 7, in a portable configuration. More specifically, the user can carry the tabletop 102 by using the resilient fastening member 106 as a shoulder strap on one arm and carrying the table leg 104 with the other arm. In an alternative embodiment, the table leg 104 may be coupled to the first end 200 by other configurations, i.e., non-removable configurations, such as by a hinge or other pivoting mechanism that allows the table leg 104 to be folded toward the bottom surface 306 for portability and extended outwardly perpendicular to the tabletop 102 for use.

Referring primarily to FIGS. 1-3, the tabletop 102 may include a bottom portion 208. The bottom portion 208 may be disposed beneath the top surface 116 and may define a resilient fastening member channel 210. The resilient fastening member channel 210 may be disposed on the second end 202 and may provide a receptacle to receive at least a portion of the resilient fastening member 106 therein for coupling the second end 202 of the tabletop 102 to the independent support structure 108. In a further embodiment, the resilient fastening member channel 210 may be operably configured to receive a first portion (not shown) of the resilient fastening member 106 therein, with a second portion 308 of the resilient fastening member 106 extending outwardly relative to the tabletop 102, away from the second end 202 of the tabletop 102.

In one embodiment, the resilient fastening member channel 210 may be disposed beneath the top surface 116 of the tabletop 102 so as to provide a clearance zone on the top surface 116 for the user to use all or substantially all of the top surface 116 as a table. In other words, providing the resilient fastening member channel 210 and the resilient fastening member 106 above the tabletop 102 would likely reduce the usable area of the tabletop 102 and could be an obstruction.

In one embodiment, the resilient fastening member channel 210 may be curved-shaped (e.g., C-shaped). In another embodiment, the resilient fastening member channel 210 may be rectilinear-shaped or be shaped as another type of polygon. In one embodiment, an entrance opening and/or exit opening for the channel 210 may be disposed laterally and defined by a sidewall of the tabletop 102.

Referring now primarily to FIGS. 4a-4d, with brief reference to FIGS. 1-3, the exemplary resilient fastening member 106 and method of coupling the same to the second end 202 is shown. As illustrated in the sequential depiction, the user may slideably insert one end of the resilient fastening member 106 into an entrance opening of the resilient fastening member channel 210 (FIG. 4b) and may pass the end through an exit opening of the resilient fastening member channel 210 (FIG. 4c). Subsequently, the user may fasten opposing ends of the resilient fastening member 106 (FIG. 4d), such as by use of a buckle 400, similar to a belt buckle. The buckle 400 may be used by the user to selectively tighten and secure the second end 202 of the tabletop 102 to the independent support structure 108. In other embodiments, instead of a buckle 400 to allow the user to selectively tighten and fasten the tabletop 102 to the independent support structure 108, there may be provided other features, such as, a hook-and-loop fasteners arrangement, snap fastening, retaining rings, a zip tie, a clip, a clamp, or the like.

The resilient fastening member 106 should be able to be selectively tightened so as to provide the user with a flexibility to be able to tighten and secure the tabletop 102 to independent support structures 108 having various thicknesses. In one embodiment, the resilient fastening member 106 is formed as an adjustable strap. In another embodiment, the resilient fastening member 106 is formed as a shoulder strap. In another embodiment, the resilient fastening member 106 may be formed as a belt-like fastener. In yet another embodiment, the resilient fastening member 106 may be made of leather, a resilient fabric, or other resilient or flexible material. In one embodiment, the resilient fastening member 106 may be made of a polymer-based material. Preferably, the resilient fastening member 106 is made of a relatively strong material (e.g., nylon) suitable for securely fastening the tabletop 102 to independent support structures 108 so as to firmly support the tabletop 102 and weighted items (e.g., food, drinks, art materials, a laptop or computer tablet, etc.) that may be placed on the tabletop 102 by users, including at least a portion of one or more users' weights, such as by leaning on the tabletop 102. In yet other embodiments, the resilient fastening member 106 may be made of other materials. As used herein, the term "resilient fastening member" is intended to indicate a fastening member that is able to recoil or spring back into shape after bending, stretching, and/or being compressed.

Figure 9:
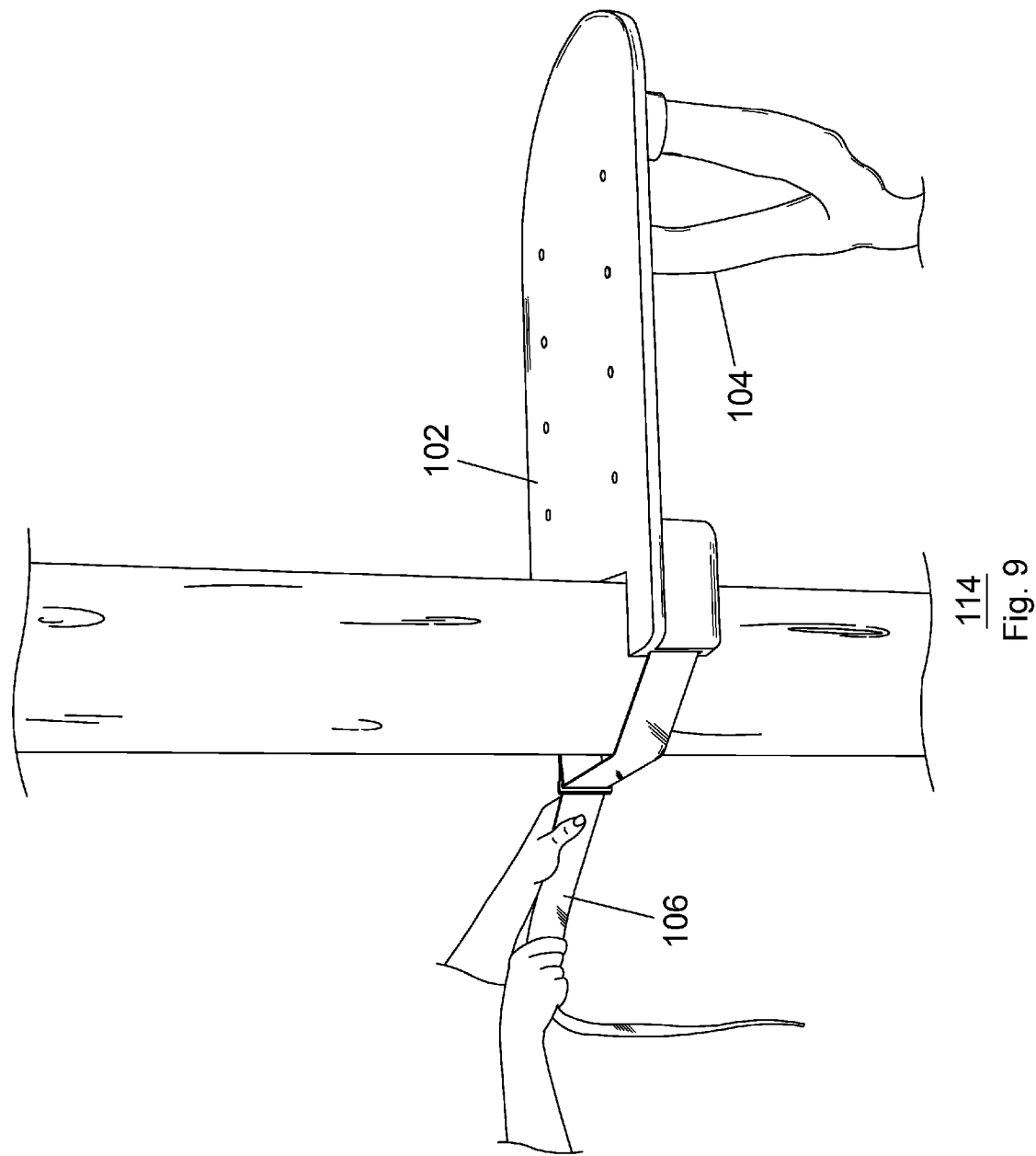
FIG. 9 is perspective side view of yet another exemplary embodiment of a table assembly with a table leg, a tabletop, and a fastening member, in accordance with the present invention, illustrating a user tightening, by the fastening member, the tabletop to a building column.

The resilient fastening member 106 may be provided with varying widths, thicknesses, lengths, shapes, sizes, and cross-sections. In one embodiment, the resilient fastening member 106 may be at least 60 inches in length so as to provide a sufficient length to wrap around independent support structures 108 of varying widths and thicknesses, while also providing enough excess length in order for the user to grip, pull, and tighten the resilient fastening member 106 about the independent support structure 108, as best illustrated in FIG. 9. In another embodiment, the resilient fastening member 106 may more or less than 60 inches. In one embodiment, an interior side of the resilient fastening member 106 may be a smooth planar surface, so as to be usable as a shoulder strap in a portable configuration, as is illustrated in FIG. 7.

In an alternative embodiment, the resilient fastening member 106 may be coupled to the tabletop 102 with other methods and apparatuses. In one embodiment, the resilient fastening member 106 may be, for example, coupled to the second end 202 by one or more hooks or rings affixed to the second end 202 of the tabletop 102 that are adapted to fasten to the resilient fastening member 106. In yet another embodiment, the second end 202 of the tabletop 102 may, for example, define one or more apertures therein for receiving the resilient fastening member 106 therein for securing the resilient fastening member 106 to the second end 202. In yet other embodiments, the resilient fastening member 106 may be coupled to the tabletop 102 with hook-and-loop fasteners, or other types of fastening arrangements.

Figure 6:
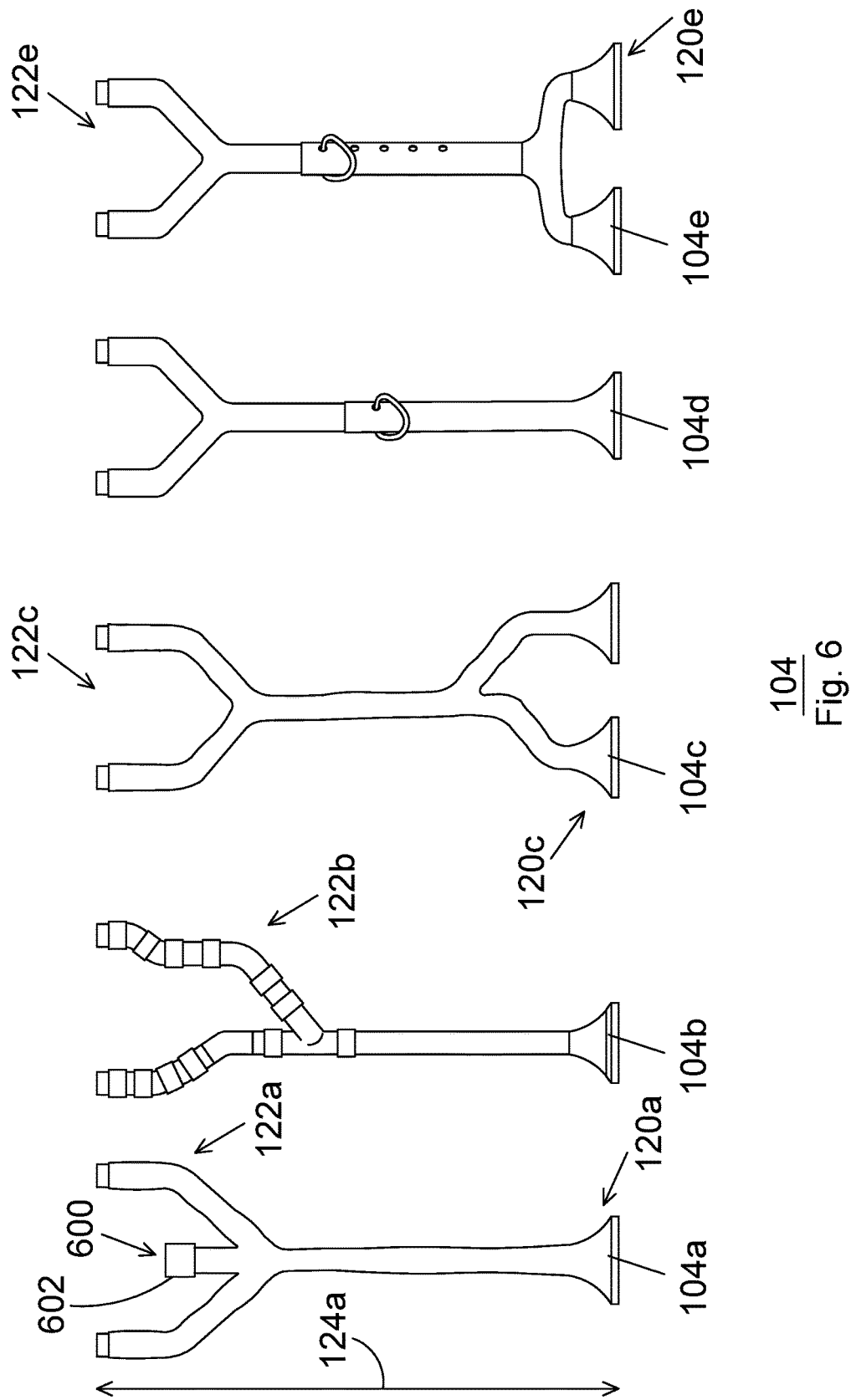
FIG. 6 is a front elevational view of a plurality of table leg embodiments for use with the tabletop and the fastening member of FIG. 1, in accordance with an exemplary embodiment of the present invention.

Referring now primarily to FIG. 6, with brief reference to FIGS. 1-3, the table leg 104 is shown in various exemplary embodiments. In one embodiment, the table leg 104a includes the ground-engaging end 120a, which may be a single-foot end, opposite the tabletop-engaging end 122a, which may be a double-foot end. In one embodiment, the table leg height 124a may be at least 41 inches. In other embodiments, the table leg height 124a may be more or less than 41 inches. In one embodiment, one of the ends 120a and 122a may include a storage portion 600 for storing the pegs 1000 therein. In another embodiment, the table assembly 100 may include at least four pegs 1000 stored within the storage portion 600. In one embodiment, the storage portion 600 defines a cavity (not shown) for storing pegs 1000 therein and may also include a removable cap 602 for selectively opening and closing to access the pegs 1000.

Table legs 104b and 104c illustrate alternative embodiments for the table leg 104. The table leg 104b shows a "Y"-shaped tabletop-engaging end 122b with decorative features thereon. The table leg 104c shows a "Y"-shaped tabletop-engaging end 122c and a double-foot/"Y"-shaped ground-engaging end 120c. The table leg 104d is formed as a height-adjustable table leg, with a telescoping feature. The table leg 104e is also formed as a height-adjustable table leg, with an alternative telescoping feature. In one embodiment, the table leg 104e may include the tabletop-engaging end 122e having a width of 15 inches and the ground-engaging end 120e, having a width of 18 inches. In other embodiments, the table leg 104c may be formed with other dimensions, shapes, sizes, and configurations.

Referring again primarily to FIGS. 1-3, in one embodiment, the table leg height 124 may be sized such that the tabletop 102 is disposed a height above the ground surface 110 so as to be a standing table. In another embodiment, the table leg height 124 may be sized such that the tabletop 102 is disposed a height above the ground surface 110 so as to be a sitting table. In yet another embodiment, the table leg 104 is an adjustable-height table leg so as to be able to adjust the height of the tabletop 102 for user-selection of the tabletop 102 as a standing table or as a sitting table.

The table leg 104 may be made of any material suitable to support the tabletop 102. In one embodiment, the table leg 104 may be made of a plastic, or other polymer material. In another embodiment, the table leg 104 may be made of a wood material. In yet another embodiment, the table leg 104 may be made of other materials. Preferably, the table leg 104 is made of a relatively light-weight material so as to be portable, in the portable configuration (see FIG. 7), but also relatively strong so as to be able to support weighted items on the table, such as food, drink, art materials, and the like.

Figure 11:
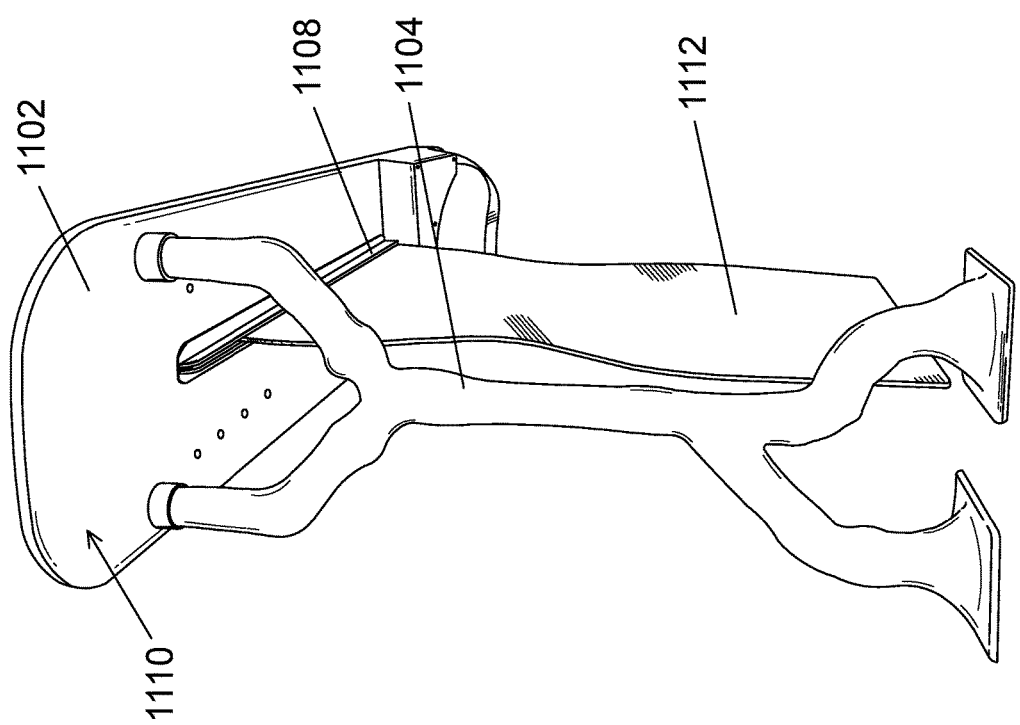
FIG. 11 is an upward-looking perspective view of another exemplary embodiment of a table assembly, in accordance with the present invention, showing a track disposed on the bottom portion of the tabletop for slideably receiving a decorative panel.

Referring now to primarily to FIG. 11, another exemplary embodiment of a table assembly 1100 is shown. The table assembly 1100 includes an elongated tabletop 1102, a table leg 1104 and a resilient fastening member (not shown). The table assembly 1100 may, in one embodiment, be sized of a sufficient length for handicapped individuals. The table assembly 1100 may also include a track 1108 disposed on a bottom surface 1110 of the elongated tabletop 1102. The track 1108 may be sized, shaped, and otherwise operably configured to receive a panel 1112 therethrough for hanging from the tabletop 1102. The panel 1112 may be formed as a decorative panel 1112. In one embodiment, the panel 1112 is made of a wood material. In other embodiments, the panel 1112 may be made of other materials.

Referring now primarily to FIG. 12, with reference also to FIGS. 1-3, 5, 7, and 9, an exemplary method of mounting the table assembly 100 to an independent support structure 108 is illustrated in a flow chart. Although FIG. 12 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 12 for the sake of brevity.

The exemplary method begins in step 1200 and may immediately proceed to step 1202, where the user may locate the independent support structure 108, which may be one of a natural or a man-made structure, and may be fixedly connected or otherwise disposed on the ground. In one embodiment, the independent support structure 108 may also extend upwardly from the ground in a generally vertical direction.

In step 1204, the user may couple the table leg 104 to the first end 200 of the tabletop 102. In one embodiment, the user may couple the table leg 104 to a bottom of the tabletop 102. In a further embodiment, the user may couple the table leg 104 to the tabletop 102 as depicted in FIG. 5 herein and also described in the corresponding portions of the written description herein.

In step 1206, the user may couple the resilient fastening member 106 to the second end 202 of the tabletop 102. In one embodiment, the user may do so by inserting the resilient fastening member 106 into the resilient fastening member channel 210 defined by the tabletop 102, as depicted and described with reference to FIGS. 4a-4d and the corresponding written description herein. In other embodiments, the user may couple the resilient fastening member to the tabletop 102 in other methods and with other apparatuses.

In step 1208, the user may fasten the tabletop 102 to the independent support structure 108. More specifically, in one embodiment, the user may fasten, by the resilient fastening member 106, the second end 202 of the tabletop 102 to the independent support structure 108 such that the second end 202 is supported by the independent support structure 108, while the first end 200 is simultaneously supported by the table leg 104. In another embodiment, the user may engage the lateral recess 204 defined by the second end 202 of the tabletop 102 to at least a portion of the independent support structure 108. In a further embodiment, the user may matingly engage the lateral recess 204 to at least a portion of the independent support structure 108. The user may next couple ends of the resilient fastening member 106 to one another about the independent support structure 108 and may selectively tighten the resilient fastening member 106 about the independent support structure 108 (as best depicted in FIG. 9) so as to secure the tabletop 102, together with the table leg 104, in the upright configuration 114.

When the user is ready to leave the area and/or no longer utilize the table assembly 100, the user may dissemble the table assembly 100, by, for example, uncoupling the resilient fastening member 106 to the independent support structure 108 and removeably uncoupling the table leg 104 from the tabletop 102. The user may carry the tabletop 102 by utilizing the resilient fastening member 106 as a shoulder strap, as best shown in FIG. 7. In one embodiment, the user may carry the table leg 104 with one hand. In an alternative embodiment, the user may simply fold a pivoting table leg 104 towards the tabletop 102 in a folded configuration. The process ends immediately at step 1210.

A novel and efficient one-legged table assembly has been disclosed. Embodiments of the present invention provide a table assembly that is relatively light-weight and convenient to set-up in an outdoor environment, as well as, indoor environments. In addition, embodiments of the one-legged table assembly are intended to be partially supported by independent support structures, such as trees or outdoor building columns. By not requiring two or more legs to support the tabletop, the weight of the table structure can be greatly reduced, as well as, the manufacturing costs that would be expended to manufacture additional legs. Embodiments of the present invention are designed to be environmentally friendly, being made from recycled materials. Also, by not manufacturing additional legs and, instead using independent support structures for support, the table assembly of the present invention reduces waste. In addition, fastening the one-legged table assembly to independent natural structures, such as trees, as with some embodiments of the present invention, gives users the feeling of being closer to nature. Other embodiments of the present invention include a single support leg couplable to one end of a tabletop and a fastening strap couplable to an opposing end of the tabletop. In further embodiments, the fastening strap is intended to be secured to the independent support structure so that the opposing end of the tabletop can be partially supported by said independent support structure; in other words, leveraging independent support structures so as to provide two-legged tabletop support with only a single table leg.

What is claimed is:

1. A table assembly comprising:
   a tabletop having a first end and a second end, opposite the first end;
   a table leg having a ground-engaging end opposite a tabletop-engaging end, the tabletop-engaging end being "Y"-shaped and couplable to the first end of the tabletop through at least two table leg receptacles on the tabletop such that the table leg is substantially perpendicular to the tabletop and disposed to support the first end when coupled thereto;
   a resilient fastening member couplable to the second end and operably configured to selectively fasten the second end to an independent support structure so as to support the second end when the resilient fastening member is fastened to the independent support structure; and wherein the independent support structure is one of a tree and a building column, and the second end defines a lateral recess shaped and configured to matingly receive at least a portion of one of the tree and the building column.

2. The table assembly in accordance with claim 1, wherein:
the lateral recess is shaped to receive the at least a portion of the independent support structure therein from a lateral direction.

3. The table assembly in accordance with claim 1, wherein:
the resilient fastening member and the lateral recess together define a receiving area operably configured to receive the independent support structure therein.

4. The table assembly in accordance with claim 1, wherein:
the resilient fastening member is formed as an adjustable strap.

5. The table assembly in accordance with claim 1, wherein:
the table leg is removeably couplable to the first end; and
the resilient fastening member is formed as a shoulder strap operably configured for a user to carry the tabletop.

6. The table assembly in accordance with claim 1, wherein:
the independent support structure is fixedly connected to a ground surface on which the table leg is adapted to rest when supporting the first end of the tabletop in an upright configuration.

7. The table assembly in accordance with claim 1, wherein:
the first end of the tabletop to which the table leg is couplable is not a center portion of the tabletop; and
the table assembly is adapted for use without a second table leg.

8. The table assembly in accordance with claim 1, wherein:
the tabletop further includes a bottom portion disposed beneath a top surface of the tabletop, the bottom portion defining a resilient fastening member channel disposed beneath the top surface of the tabletop and operably configured to receive a first portion of the resilient fastening member therein, with a second portion of the resilient fastening member extending outwardly relative to the tabletop away from the second end of the tabletop.

9. The table assembly in accordance with claim 1, wherein:
the tabletop defines at least one aperture having an opening defined by a top surface of the tabletop, the opening shaped to receive a peg through the top surface and the aperture sized to frictionally retain a coupled end of the peg therein, with a free end of the peg extending in a vertical direction above the top surface so as to form a protrusion on the tabletop, the free end disposed opposite the coupled end.

10. A one-legged table assembly comprising:
a tabletop having a first end, a second end opposite the first end, a top surface, and a bottom surface opposite the top surface;

a table leg having a ground-engaging end opposite a tabletop-engaging end, the tabletop-engaging end being "Y"-shaped and couplable to the bottom surface of the first end of the tabletop through at least two table leg receptacles on the bottom surface of the first end of the tabletop so as to support the first end in an upright configuration when coupled thereto and when the ground-engaging end of the table leg is disposed on a ground surface, the table leg being substantially perpendicular with respect to the top surface of the tabletop when the tabletop-engaging end of the table leg is coupled to the bottom surface of the tabletop;

a resilient fastening member couplable to the second end and operably configured to selectively fasten the second end to an independent support structure so as to support the second end in the upright configuration when the resilient fastening member is fastened to the independent support structure, the independent support structure being fixedly connected to the ground surface on which the ground-engaging end of the table leg is disposed in the upright configuration; and wherein the independent support structure is one of a tree and a building column, and the second end defines a lateral recess shaped and configured to matingly receive at least a portion of one of the tree and the building column.

11. The one-legged table assembly in accordance with claim 10, wherein:
the lateral recess is shaped to receive the at least a portion of the independent support structure therein from a lateral direction.

12. The one-legged table assembly in accordance with claim 10, wherein:
the resilient fastening member and the lateral recess together define a receiving area operably configured to receive the independent support structure therein.

13. The one-legged table assembly in accordance with claim 10, wherein:
the resilient fastening member is formed as an adjustable strap.

14. The one-legged table assembly in accordance with claim 10, wherein:
the first end to which the table leg is couplable is not a center portion of the tabletop; and
the table assembly is adapted for use without a second table leg.

15. The one-legged table assembly in accordance with claim 10, wherein:
the tabletop further includes a bottom portion disposed beneath the top surface of the tabletop, the bottom portion defining a resilient fastening member channel disposed beneath the top surface of the tabletop and operably configured to receive a first portion of the resilient fastening member therein, with a second portion of the resilient fastening member extending outwardly relative to the tabletop away from the second end of the tabletop.

16. A method of forming a two-legged table by mounting a one-legged table assembly to at least one of a natural or man-made independent support structure fixedly connected to a ground, the method comprising steps of:
locating an independent support structure that is at least one of a natural and a man-made independent support structure fixedly connected to a ground and extending upwardly from the ground in a vertical direction;
coupling a table leg to a first end of a tabletop in a substantially perpendicular orientation with respect to the tabletop the table leg including a tabletop-engaging end that is "Y"-shaped and is couplable to the tabletop through at least two table leg receptacles on the tabletop;

coupling a resilient fastening member to a second end of the tabletop, the second end of the tabletop defining a lateral recess;

fastening the second end of the tabletop to the independent support structure such that the second end is supported by the independent support structure and the first end is supported by the table leg; and matingly engaging the lateral recess to at least a portion of the independent support structure and selectively tightening the resilient fastening member about the independent support structure so as to secure the tabletop, together with the table leg, in an upright configuration.

17. The method in accordance with claim 16, wherein the step of coupling the resilient fastening member further includes:

inserting the resilient fastening member into a channel defined by the tabletop.

\* \* \* \* \*